United States Patent [19]

Tono

[11] Patent Number: 5,171,474
[45] Date of Patent: Dec. 15, 1992

[54] METHOD FOR TREATING A PHOSPHOR

[75] Inventor: Hideo Tono, Odawara, Japan

[73] Assignee: Kasei Optonix, Ltd., Tokyo, Japan

[21] Appl. No.: 649,587

[22] Filed: Jan. 17, 1991

[30] Foreign Application Priority Data

Jan. 22, 1990 [JP] Japan .................................. 2-10756

[51] Int. Cl.$^5$ ............................................. C09K 11/01
[52] U.S. Cl. ........................ 252/301.4 S; 252/301.4 R
[58] Field of Search ................... 252/301.4 R, 301.4 S

[56] References Cited

U.S. PATENT DOCUMENTS

| | | | |
|---|---|---|---|
| 3,420,860 | 1/1969 | Ropp | 252/301.4 R |
| 3,492,241 | 1/1970 | Tulip et al. | 252/301.4 R |
| 3,763,050 | 10/1973 | Dikhoff et al. | 252/301.4 S |

*Primary Examiner*—Jack Cooper
*Attorney, Agent, or Firm*—Oblon, Spivak, McClelland, Maier & Neustadt

[57] ABSTRACT

A method for treating a phosphor, which comprises treating a phosphor with an aqueous reagent solution comprising a chelating agent, an oxidizing agent and an alkali agent.

4 Claims, No Drawings

METHOD FOR TREATING A PHOSPHOR

The present invention relates to a method for treating a phosphor recovered from a developing step and a coating step, with an aqueous reagent solution.

A fluorescent layer of a color picture tube is formed usually in such a manner that green-, blue- and red-emitting phosphors are respectively mixed with predetermined proportions of polyvinyl alcohol, ammonium dichromate, a surfactant, etc. to obtain phosphor slurries, then each phosphor slurry thereby obtained is coated on the entire surface of a face plate having a black matrix preliminarily formed with carbon, by a suitable coating method such as a spin coating method, then ultraviolet rays are irradiated through a shadow mask or an aperture grille to cure the predetermined portions, followed by developing with warm water. This operation is repeated with respect to the three-color emitting phosphors to form a fluorescent layer with dots or stripes in a predetermined arrangement.

The recovered phosphors include the one recovered as dripped or shaked off from the face plate (glass panel) in the coating step and the one recovered as washed off by water for development in the developing step. The former will be in an amount several times the coated amount although the amount varies depending upon the coating method. The latter will also be substantial at a level of at least 70% of the coated amount. Among such recovered phosphors, a red emitting phosphor containing expensive rare earth elements, is usually recovered and reused. However, the recovered phosphor contains in addition to polyvinyl alcohol and ammonium dichromate as constituting components of the phosphor slurry, other color-emitting phosphors (i.e. blue- and green-emitting phosphors in the case of the red-emitting phosphor). Further, part of carbon of the black matrix on the face plate also falls off and will be contained in the recovered phosphor. Especially, the phosphor recovered in the developing step is the one obtained by washing non-exposed portions with developing water and thus contains substantial amounts of other color-emitting phosphors.

Such a recovered phosphor is subjected to removal of impurities to increase the purity for reuse. Namely, with respect to organic substances (such as PVA), treatment by means of an oxidizing agent, alkali treatment, pyrolytic treatment (400°–450° C.) or the like is conducted, and with respect to other color-emitting phosphor contaminants (for example, ZnS:Ag as a blue-emitting phosphor, and ZnS:Cu, Al as a green-emitting phosphor), a method of dissolving and removing them by means of sodium hypochlorite or a mineral acid (such as HCl, $H_2SO_4$ or $HNO_3$) is employed. However, the mineral acid and a sulfide as a phosphor component are likely to react to form hydrogen sulfide. This hydrogen sulfide will then react with copper or a copper compound contained in the recovered phosphor and with heavy metal ions such as Cu and Ag contained in the other color-emitting phosphors (i.e. Cu of the green-emitting phosphor ZnS:Cu,Al, and Ag of the blue-emitting phosphor ZnS:Ag,Cl) in the system to form hardly soluble CuS, AgS, etc., which firmly adhere to the phosphor surface. Further, carbon is also likely to strongly adhere to the surface of the phosphor. Particularly with the one having the body color turned gray, there is no good method for improvement. Heat treatment, ball mill treatment or the like has been attempted, but no adequate effects have been obtained. In the case of a phosphor having carbon adhered as described above, the degree of adherence of the above sulfide tends to be much stronger. And, it is very difficult to remove the sulfide adhered to the surface of the phosphor, and such a sulfide will remain in the regenerated phosphor.

Further, Japanese Unexamined Patent Publication No. 294789/1989 discloses a method wherein the phosphor is treated with an acid, an alkali, an ammonium salt, or an ammonium salt and a chelating agent, in order to remove zinc oxide or zinc hydroxide formed on the surface of the phosphor. On the other hand, Japanese Unexamined Patent Publication No. 118483/1981 discloses a method wherein a chelating agent or an organic acid is used to remove chromium ions from the surface of the phosphor. However, such reagents do not provide adequate function for the removal of copper or a copper compound.

Thus, if copper or a copper compound remains as impurity even in a very small amount in the regenerated phosphor, so-called copper contamination will be formed on the fluorescent layer coated with such a phosphor. This means that a very small amount of copper is included in the blue picture element, whereby the initial blue emission undergoes a color change to green emission in the process of panel baking. Specifically, green specks are formed in the blue picture element portion to impair the color performance of the blue picture element. This color change to green is believed to occur as a result that the included copper ions are diffused into the crystal of blue phosphor, the blue emitting phosphor ZnS:Ag undergoes a compositional change to ZnS:Cu or ZnS:Cu,Ag.

It is an object of the present invention to overcome the above drawbacks and present a method for certainly removing copper or a copper compound adhered to the surface of the phosphor, which makes it possible to produce a regenerated phosphor of good quality which is free from forming copper contamination.

The present invention provides a method for treating a phosphor, which comprises treating a phosphor with an aqueous reagent solution comprising a chelating agent, an oxidizing agent and an alkali agent. It is advisable that the treatment is conducted while maintaining the temperature of the aqueous reagent solution at a level of at least 40° C., more preferably at least 50° C.

Now, the present invention will be described in further detail with reference to the preferred embodiments.

According to the present invention, decomposition of a copper compound such as copper sulfide or copper oxide or metallic copper adhered to the phosphor surface, is accelerated by the oxidizing agent and the alkali agent, and the decomposed copper ions are captured and dissolved by the water soluble chelating agent and thereby separated and removed from the phosphor.

As the oxidizing agent, a peroxide such as hydrogen peroxide or sodium peroxide, an oxyacid or its salt such as an alkali metal perchlorate, an alkali metal periodate, an alkali metal perbromate or periodic acid, hypochlorous acid, or an alkali metal hypochlorite can, for example, be used. As the alkali agent, aqueous ammonia, sodium hydroxide, potassium hydroxide or lithium hydroxide can, for example, be used. As the aqueous chelating agent, ethylenediaminetetraacetic acid (EDTA), iminodiacetic acid (IDA), nitrilotriacetic acid (NTA) diethylenetriaminopentaacetic acid (DTPA) or triethylenetetraminehexaacetic acid can, for example, be used.

The aqueous reagent solution of the present invention comprises the above chelating agent, the oxidizing agent and the alkali agent. There is no particular restriction as to the order of incorporating these reagents. However, better effects can be obtained by incorporating and mixing the reagents to the phosphor suspension sequentially rather than adding the reagent solution having all the reagents mixed all at once.

Further, it is preferred to use the aqueous reagent solution at a temperature of at least 40° C., more preferably at least 50° C. There is no particular restriction as to the upper limit of the solution temperature. However, it is usually advisable to use it at a temperature of not higher than 85° C., more preferably not higher than 75° C. When the aqueous reagent solution is introduced into the phosphor suspension, it is advisable to maintain the temperature of the entire solution within the above temperature range.

100 g of a recovered red-emitting phosphor having conventional mineral acid treatment applied and containing 1.8 ppm of copper, was treated at 60° C. by means of 400 ml of the aqueous reagent solution as identified in Table 1, whereupon the removal rate of copper (Cu content was represented by ppm) and the reflectance of powder at 500 nm were compared. The results are shown in Table 1.

As is apparent from this comparative experiment, in the case of Sample No. 2 having merely acid treatment applied thereto, copper was not removed at all and remained untreated. Further, in each case of Sample No. 3 treated by the chelating agent only, Sample No. 4 treated by the alkali agent only and Sample No. 5 treated by the oxidizing agent only, copper was not substantially removed. By the combination of reagents as in Sample Nos. 6 and 7, the copper removing effects were slightly observed, but the degree of the removal was very low.

Whereas, in the case of Sample No. 8 which is the Example of the present invention, the copper content was as low as 0.1 ppm or less, which is a satisfactory level from the viewpoint of the color change.

Further, the treating method of the present invention is also effective as a method for removing copper sulfide as a contaminant from a copper-activated sulfide type electric field emission phosphor to which copper sulfide adheres during the firing process.

EXAMPLE 1

A red-emitting phosphor ($Y_2O_2S:Eu$) recovered in a developing step was subjected to removal of organic substances by means of an oxidizing agent in accordance with a conventional method and then further to removal of contaminant colors such as zinc sulfide (blue-emitting phosphor of $ZnS:Ag$, green emitting phosphor of $ZnS:Cu, Al$) by means of hydrochloric acid, to obtain 200 g of a phosphor treated by the conventional method. This red-emitting phosphor was introduced into 800 ml of deionized water at 70° C. and thoroughly suspended. Then, 1.6 g (the concentration of solution is 0.2%) of a chelating agent EDTA was added and thoroughly stirred, then 2.8 ml (the concentration of solution is 0.1%) of aqueous ammonia (28% reagent) was added, and further 5.3 ml (the concentration of solution is 0.2%) of an aqueous hydrogen peroxide solution (30% reagent) was added. The above suspension was stirred for 30 minutes while maintaining it at a temperature of from 60° to 70° C., and then left to stand still for 20 minutes to let the phosphor settle. Then, the supernatant turbid black with carbon peeled off from the surface of the phosphor was removed by decantation, and the phosphor was then washed twice with deionized water. Thereafter, the phosphor was collected by filtration and, after removal of water, dried at 120° C. and then sieved with a screen of 300 mesh.

The reclaimed phosphor thus obtained was dissolved completely with nitric acid and subjected to chemical analysis to determine the copper content. Further, for the purpose of comparison, the copper content was examined in the same manner with respect to the above mentioned phosphor treated by the conventional method. The results are shown in Table 2. It is evident from Table 2 that the copper content (ppm) of the reclaimed phosphor of the Example of the present invention, is remarkably reduced as compared with the conventional method. Further, as is evident also from the data of the reflectance of the phosphor in Table 2, carbon was removed to such an extent that the whiteness was substantially the same as that of a new product.

Further, with respect to the reclaimed phosphor and the non-treated phosphor, color change level check was conducted. Firstly, the reclaimed red-emitting phosphor was coated in the form of a predetermined PVA type slurry and the entire coated surface was subjected to exposure. Then, a blue-emitting phosphor was overcoated, and the entire overcoat layer was subjected to exposure. Further, a filming solution (an acryl emulsion) was coated thereon. The panel thus obtained was baked at 450° C. for 30 minutes. The color change was evaluated by counting green emission specks formed on the overcoat blue surface under irradiation with ultraviolet rays. The results thereby obtained are also shown in Table 2. The number of color change specks remarkably decreased with the reclaimed phosphor as compared with the non-treated phosphor, thus showing that the reclaimed phosphor does not substantially contain a copper ion source which causes the color change.

According to the present invention, by adopting the above construction, it is possible to substantially remove the copper component as a contamination source from the phosphor recovered from the developing step and the coating step, and the color change can be avoided with respect to the reclaimed phosphor.

TABLE 1

| Sample No. | Treatment | Cu content (ppm) | Reflectance of powder (%) |
|---|---|---|---|
| 1 | No treatment (already treated by conventional method) | 1.8 | 84 |
| 2 | HCl (6N solution) | 1.8 | 83 |
| 3 | EDTA solution (0.2%) | 1.6 | 85 |
| 4 | NH$_4$OH solution (0.1%) | 1.5 | 84 |
| 5 | H$_2$O$_2$ solution (0.2%) | 1.6 | 85 |
| 6 | EDTA solution (0.2%) + NH$_4$OH solution (0.1%) | 1.1 | 88 |
| 7 | EDTA solution (0.2%) + H$_2$O$_2$ solution (0.2%) | 0.9 | 90 |
| 8 | EDTA solution (0.2%) + NH$_4$OH solution (0.1%) + H$_2$O$_2$ solution (0.2%) | 0.1 or less | 95 |
| 9 | Treated by the same reagent as used for Sample No. 8, at a treating | 0.8 | 90 |

TABLE 1-continued

| Sample No. | Treatment | Cu content (ppm) | Reflectance of powder (%) |
|---|---|---|---|
| | temperature of 20° C. | | |

Note: Samples No. 8 and 9 are the Example of the present invention.

TABLE 2

| Sample No. | Cu content (ppm) | Number of color change specks | Reflectance of powder (%) at 500 nm |
|---|---|---|---|
| 1 | 0.1 or less | 0 | 95 |
| 2 | 1.8 | 6 | 84 |

Note: Sample No. 1 is the Example of the present invention.

EXAMPLE 2

The same treatment as in Example 1 was conducted except that the chelating agent EDTA was changed to iminodiacetic acid (IDA), and 5.3 ml of the aqueous hydrogen peroxide solution (30% reagent) was changed to 2 g of sodium periodate (NaIO$_4$) reagent. The results are shown in Table 3.

TABLE 3

| Sample No. | Cu content (ppm) | Number of color change specks | Reflectance of powder (%) at 500 nm |
|---|---|---|---|
| 3 | 0.1 or less | 0 | 94 |
| 4 | 1.8 | 6 | 84 |

Note: Sample No. 3 is the Example of the present invention.

I claim:

1. A method of treating a rare-earth-containing phosphor including copper or copper compound contaminants which comprises mixing the phosphor with an aqueous reagent solution comprising a chelating agent selected from the group consisting of ethylenediaminetetraacetic acid, iminodiacetic acid, nitrilotriacetic acid, diethylenetriaminopentaacetic acid, and triethylenetetraaminehexaacetic acid, an oxidizing agent selected from the group consisting of hydrogen peroxide, sodium peroxide, alkali metal perchlorate, alkali metal periodate, alkali metal perbromate, periodic acid, hypochlorous acid, and alkali metal hypochlorite, and an alkali agent selected from the group consisting of aqueous ammonia, sodium hydroxide, potassium hydroxide, and lithium hydroxide, at a temperature of from 40° to 85° C., and recovering the phosphor therefrom to provide a recovered phosphor having a lower copper content than a phosphor treated according to the above-method when either the oxidizing agent or alkali agent or both are absent.

2. The method for treating a phosphor according to claim 1, wherein the treatment is conducted while maintaining the aqueous reagent solution at a temperature of from 50° to 75° C.

3. The method for treating a phosphor according to claim 1, wherein the chelating agent is at least one member selected from the group consisting of ethylenediaminetetraacetic acid, iminodiacetic acid and nitrilotriacetic acid.

4. The method for treating a phosphor according to claim 1, wherein the oxidizing agent is at least one member selected from the group consisting of hydrogen peroxide, an alkali metal perchlorate and an alkali metal periodate.

* * * * *